US005414319A

United States Patent [19]

Nowicki et al.

[11] Patent Number: 5,414,319

[45] Date of Patent: May 9, 1995

[54] DYNAMOELECTRIC MACHINE WITH BRUSH HAVING SLANTED CORE

[75] Inventors: Henry B. Nowicki, Twinsburg; Thomas J. Oelbracht, Mentor, both of Ohio

[73] Assignee: Lucas Aerospace Power Equipment Corporation, Aurora, Ohio

[21] Appl. No.: 204,771

[22] Filed: Mar. 2, 1994

[51] Int. Cl.[6] .............................................. H02K 13/00

[52] U.S. Cl. ...................................... 310/248; 310/233

[58] Field of Search ............... 310/248, 249, 251, 252, 310/253, 233, 239

[56] References Cited

U.S. PATENT DOCUMENTS

| | | | |
|---|---|---|---|
| 276,233 | 4/1883 | Edison | 310/248 U X |
| 1,028,964 | 6/1912 | Press | 310/248 U X |
| 1,078,656 | 11/1913 | Ambruster | 310/248 U X |
| 4,843,274 | 6/1989 | Paisley | 310/239 |
| 5,083,055 | 1/1992 | Hokanson | 310/248 |

FOREIGN PATENT DOCUMENTS

| | | | |
|---|---|---|---|
| 0813564 | 3/1981 | U.S.S.R. | 310/248 |
| 1092630 | 5/1984 | U.S.S.R. | 310/248 |
| 1555749 | 4/1990 | U.S.S.R. | 310/248 |

*Primary Examiner*—R. Skudy
*Attorney, Agent, or Firm*—Rankin, Hill, Lewis & Clark

[57] ABSTRACT

Core-type brushes used in dynamoelectric machines, such as electric motors, have cores which are arranged in substantially parallel planes extending at an angle with respect to the direction at which the brushes move toward the commutator as the brushes wear. As the brushes wear, the position of the cores relative to the outer surface of the commutator changes, preventing constant positioning of the cores relative to the commutator surface and reducing or preventing non-uniform commutator wear which occurs when the cores maintain a fixed position with respect to the commutator surface as the brushes wear. This arrangement of the cores eliminates the need to resurface the commutator at brush change, reduces the time required to properly seat the brushes to the commutator and increases commutator and brush life.

12 Claims, 2 Drawing Sheets

DYNAMOELECTRIC MACHINE WITH BRUSH HAVING SLANTED CORE

BACKGROUND OF THE INVENTION

1. Field of the Invention

This invention relates to dynamoelectric machines having commutators and brushes, and more particularly to direct current electric motors and generators and to features of the design of brushes used in such machines.

2. Description of the Prior Art

Conventional machines use cored-type brushes in which the cores extend perpendicular to the cross-sectional plane which is perpendicular to the sides of the brush. These brushes thus extend in a plane that is essentially parallel to the direction in which the brushes move toward the commutator as the brushes wear.

As the brush rides on the surface of the commutator, a film develops on the outer surface of the commutator. This film has an abrasivehess depending upon the brush material, the core material, the commutator material and ambient conditions. Under certain conditions the film that develops under the cores in the brush is more abrasive to the commutator surface than the film that develops under the remaining part of the brush. This difference in abrasiveness can cause non-uniform wearing of the commutator surface. This uneven wearing of the commutator can affect the maintenance and performance of the motor. When the commutator wears unevenly, it is often necessary to resurface the commutator when the brushes are replaced in order to achieve effective contact between the brushes and the commutator and to maintain proper operation of the motor.

SUMMARY OF THE INVENTION

The present invention overcomes the problems of the prior art and provides other advantages that have not been realized heretofore. In accordance with the present invention, the cores in the brush are arranged in substantially parallel planes which extend at an acute angle with respect to the direction in which brushes move toward the commutator as they wear. Thus the brush cores extend at an angle to the normal of the cross-sectional plane which is perpendicular to the sides of the brush. In other words, the brush cores are arranged so that they are not parallel to the sides of the brush, but instead are angled. As the brush wears, the position of the cores relative to the outer surface of the commutator changes, preventing constant positioning of the cores relative to the commutator surface and reducing or preventing nonuniform commutator wear, sometimes called "grooving," which occurs when the cores maintain a fixed position with respect to the commutator surface as the brush wears.

By positioning the cores at an angle, the core material is distributed more uniformly across the entire wear surface of the commutator as the brush wears. As a result, the more abrasive material, which is attributed to the core material, is more uniformly distributed across the entire commutator surface, providing a more uniform commutator wear.

Thus, the present invention reduces or eliminates the non-uniform commutator wear, or "grooving," associated with burshes of the prior art. The present invention also reduces or eliminates the need to resurface the commutator when the brush is changed. In addition, the design of this invention reduces the time required to properly seat the brushes in the commutator, and it provides increased commutator and brush life.

These and other advantages are provided by the present invention of a dynamoelectric machine which comprises a rotatable commutator having a cylindrical outer surface. A wearable brush is mounted adjacent to the commutator. The brush comprises a plurality of cores arranged parallel to each other therein in a first direction. The brush is urged into the contact with the commutator. The brush moves in a second direction into contact with the commutator as the brush wears. The first direction in which the cores are arranged forms an acute angle with the second direction.

BRIEF DESCRIPTIQN OF THE DRAWINGS

DETAILED DESCRIPTION OF THE PREFERRED EMBODIMENT

Figure 1:
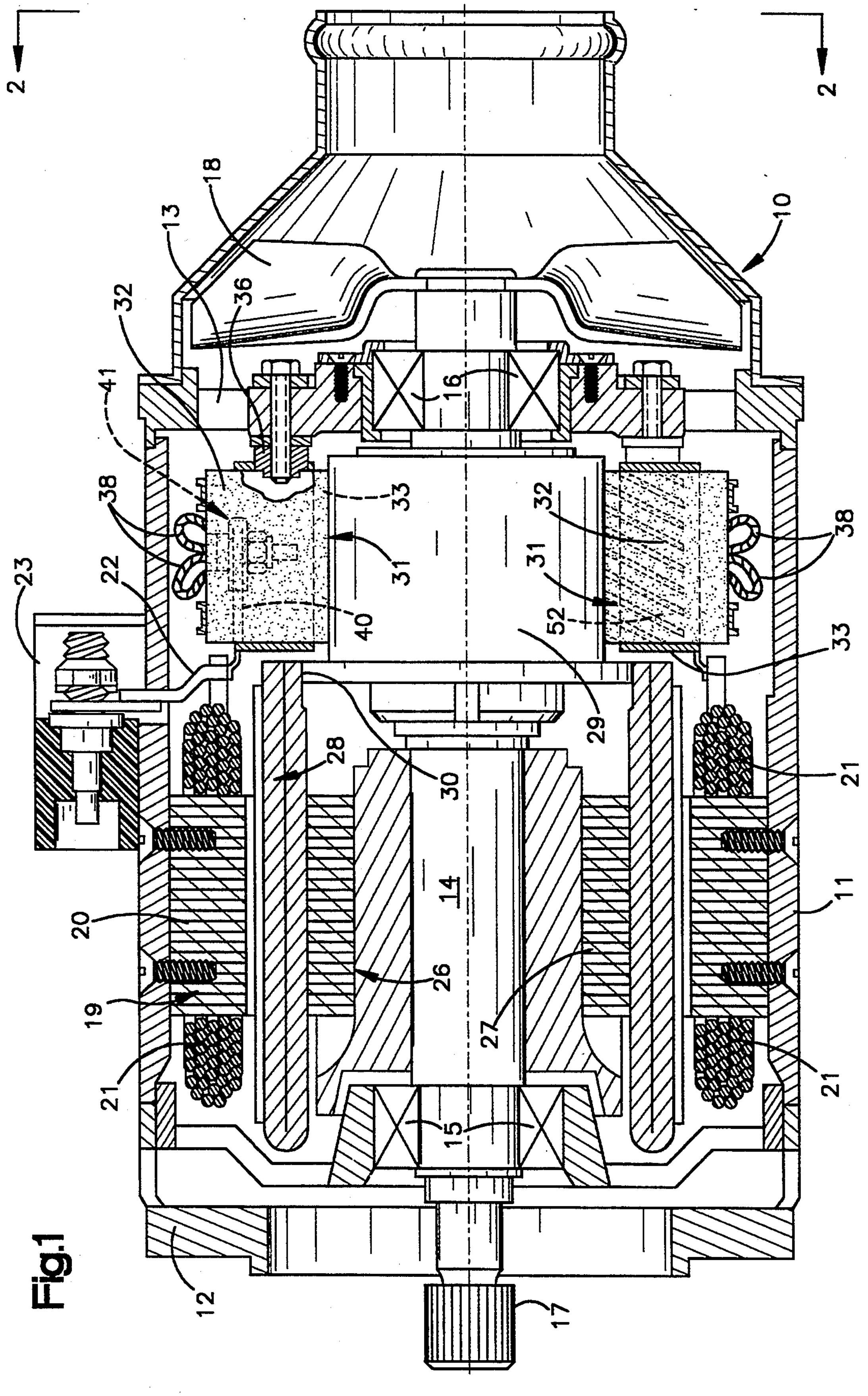
FIG. 1 is a side sectional view of a dynamoelectric machine of the present invention incorporating the brushes of the present invention.
Figure 2:
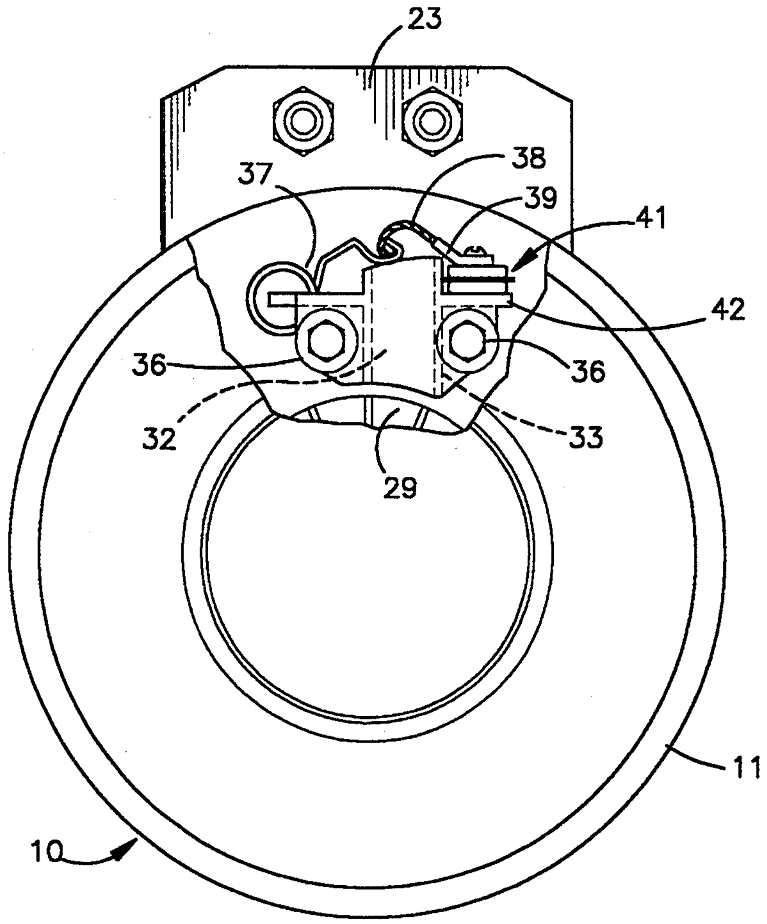
FIG. 2 is an end elevational view, partially sectioned, of the dynamoelectric machine of FIG. 1.

Referring more particularly to the drawings, and initially to FIGS. 1 and 2, there is shown a typical dynamoelectric machine in the form of a conventional DC electric motor 10 which has been modified to include the improvement of the present invention. The motor 10 has an outer housing 11 including an end shield assembly 12 and a support assembly 13. A shaft 14 is centrally mounted for rotation and supported by bearing assemblies 15 and 16 adjacent to the end shield assembly 12 and the support assembly 13, respectively. The shaft 14 has a drive connection 17 at one end and a fan 18 at the other end. Mounted within the housing 11 is a field or stator assembly 19 comprising a laminated stator core 20 supporting a plurality of windings 21. The stator windings 21 are connected to a stator winding terminal 22 through which current enters the motor 10 by suitable connections to a terminal block 23 mounted outside the housing 11.

An armature 26 is supported on the rotatable shaft 14. The armature 26 includes a laminated core 27 and a plurality of armature windings 28. A commutator 29 is supported on one end of the shaft 14 and connected through commutator risers 30 to the armature windings 28. Electrical contact brush assemblies 31 are supported for contact with the commutator 29. Each of the brush assemblies 31 comprises a brush 32 usually of a carbon composition including angularly disposed cores 52 which is held within a brush holder 33 commonly made of stainless steel or other similar material. In the embodiment shown, the motor 10 is a four-pole device showing two pairs of brush assemblies 31.

Each brush holder 33 surrounds and supports the brush 32 therein with the brush extending slightly beyond the bottom edge of the holder so that the holder does not rub against the commutator 29. The brush holder 33 has a flange assembly 36 at one end for attaching the holder to the support assembly 13. Brush springs 37 along one side of the holder 33 engage the brush at the spring rest 48 (FIG. 3) and urge the brush 32 radially inwardly toward the commutator 29 to maintain constant contact with the commutator 29 as the brush wears. For providing the current path to and from the brushes, each brush assembly 31 has an attached shunt or pigtail 38 having a terminal 39 at the end thereof. The pigtails 38, which are usually formed of stranded copper, make an electrical connection with the stator windings 21 through a lead 40 from the stator winding terminal 22. The junction 41, at which the pigtail terminal 39 is connected to the stator lead 40, is commonly supported on a flange 42 formed along the side of the brush holder 33 opposite the brush springs 37, and secured with means such as a screw and nut.

Each of the brushes 32 is in contact with the commutator 29 to provide the electrical connection to operate the motor. This contact is achieved roughly along a cross sectional plane that is perpendicular to the sides of the brush 32. More accurately, the contact is accomplished along a curved surface close to this cross sectional plane, the curved surface approximating the outer curved surface of the commutator 29. As the brush 32 wears, the brush is pushed radially toward the commutator 29 by the springs 37. The contact surface, however, remains the same as the brush wears down, and this contact surface remains the curved surface that is very near the cross sectional plane perpendicular to the sides of the brush 32.

Figure 3:
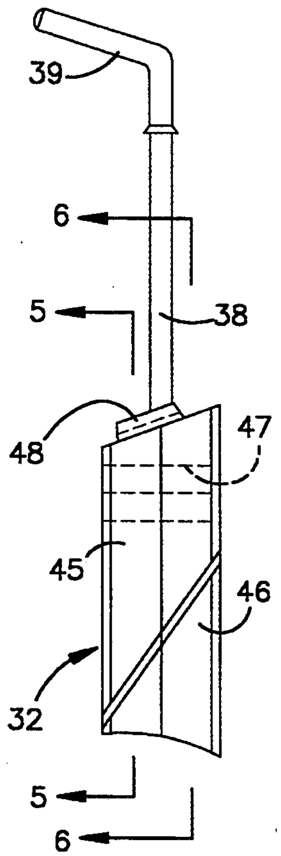
FIG. 3 is an end elevational view of the brush of the dynamoelectric machine of FIG. 2 removed from the machine.

The brush 32 of the machine of FIG. 2 is shown removed from the motor in FIG. 3.

The brush 32 is formed of a pair of carbon wafers 45 and 46. The carbon wafers 45 and 46 are arranged together in a back-to-back relationship. A connection hole 47 extends through the brush 32 and is used for the placement of a rivet (not shown) that electrically connects the brush to an electrical connector (not shown) formed on the top of the carbon wafers 45 and 46. The connector includes the pigtail 38 which is connected to the brush at the spring rest 48 and which extends from the brush to the terminal 39. The lower portion of each of the wafers contains a plurality of the evenly spaced parallel cores 52.

Figure 4:
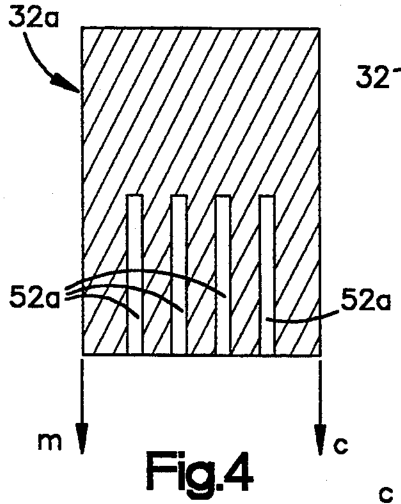
Fig.4 (PRIOR ART)
FIG. 4 is a side elevational view of a prior art brush design.

In accordance with conventional prior art design as shown in FIG. 4, the cores **52*a* extend in longitudinal planes along the brush 32*a* and which are parallel to the sides of the brush. As the brush 32*a* wears, the cores 52*a* remain in substantially the same position with respect to the outer surface of the commutator 29. As the brush 32*a* rides on the commutator surface, a thin film develops on the commutator surface. This film is formed from the brush and commutator materials, and it has a certain abrasiveness depending upon the brush material, the core material, the commutator material, and ambient conditions. Under certain conditions the film that develops under the cores 52*a* of the brush can be more abrasive to the commutator 29 than the film that develops under the remaining surface of the brush 32*a*. This difference in abrasiveness can result in non-uniform wear along the outer surface of the commutator 29**.

Figure 5:
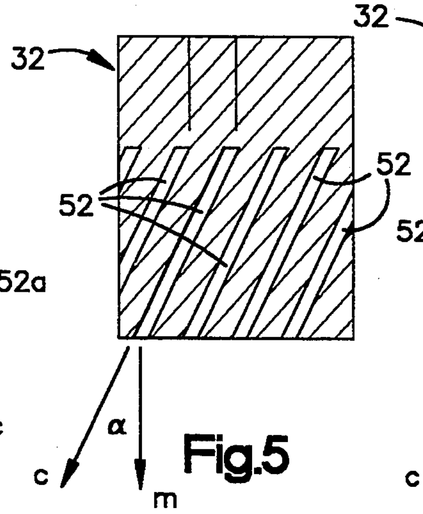
FIG. 5 is a side elevational view, similar to FIG. 4, of the brush of FIG. 3, taken along line 5—5 of FIG. 3.

In accordance with the present invention, as shown in FIG. 5, the brush cores 52 are arranged in planes which are at an angle with respect to the sides of the brush 32. Likewise, the cores 52 are arranged in planes which are at an angle to the cross sectional plane of the brush 32 that is perpendicular to the sides of the brush. The brush 32 contacts the commutator 29 along this cross sectional plane, and thus the brush wears along this plane. As the brush 32 wears, the position of the cores 52 with respect to the surface of the commutator 29 moves. The core material is thus distributed more uniformly across the entire wear surface of the commutator 29 as the brush wears.

Since the brush 32 is mounted so that the length of the brush is along a radius of the commutator 29, and since the brush is urged toward the commutator in a direction m that is radial with respect to the commutator and longitudinal with respect to the brush, the brush moves along this direction m as it wears down. The cores are arranged in planes that extend in a direction c, and the direction c forms an acute angle $\alpha$ with respect to the direction m of movement of the brush, so that as the brush wears, the position of the cores changes with respect to the commutator so that the core material is deposited on the commutator in different locations.

The angle $\alpha$ between the direction c in which the cores 52 extend and the direction m of movement of the brush 32 as it wears must be sufficiently offset from 0° so as to provide significant change of position of the cores relative to the outer surface of the commutator 29 as the brush wears. Preferably the acute angle $\alpha$ between the direction c of the cores 52 and the direction m of brush movement is between 15° and 45°. The angle $\alpha$ shown in FIGS. 5 and 6 is approximately 30°.

Figure 6:
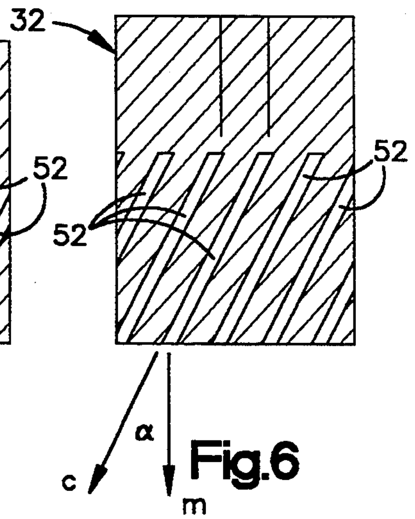
FIG. 6 is another cross sectional view of the brush of FIG. 3 taken along line 6—6 of FIG. 3.

Likewise, the direction at which the cores 52 should form an acute angle with respect to the plane perpendicular to the sides of the brush, and this acute angle should be preferably between 75° and 45°, with 60° shown in FIGS. 5 and 6.

By positioning the cores 52 at an angle, the more abrasive material which is attributed to the core material is more uniformly distributed across the entire commutator surface resulting in a more uniform commutator wear.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advanced by the invention.

What is claimed is:

1. A dynamoelectric machine, which comprises:

a rotatable commutator having a cylindrical outer surface;

a wearable brush mounted adjacent to the commutator, the brush comprising a plurality of cores arranged parallel to each other therein in a first direction, the cores comprising a core material;

means for urging the brush into contact with the commutator; and means for allowing movement of the brush in a second direction into contact with the commutator as the brush wears, the first direction in which the cores are arranged forming an acute angle with the second direction, the position of the cores changing with respect to the commutator as the brush moves in the second direction to deposit core material on the commutator in different locations as the brush wears.

2. A dynamoelectric machine as defined in claim 1, wherein the acute angle is between 15° and 45°.

3. A dynamoelectric machine as defined in claim 2, wherein the acute angle is approximately 30°.

4. A dynamoelectric machine, which comprises:

a rotatable commutator having a cylindrical outer surface; and a wearable brush having sides and ends, a cross sectional plane being defined at one end of the brush perpendicular to the sides of the brush, the brush contacting the outer surface of the commutator near the cross sectional plane, the brush comprising a plurality of cores arranged parallel to each other therein, the cores comprising a core material, the cores extending in a direction which is at an acute angle with respect to the cross sectional plane, the core material deposited on the commutator in different locations as the brush wears.

5. A dynamoelectric machine as defined in claim 4, wherein the acute angle between the direction that the cores extend and the cross sectional plane is between 75° and 45°.

6. A dynamoelectric machine as defined in claim 5, wherein the acute angle between the direction that the cores extend and the cross sectional plane is approximately 60°.

7. A dynamoelectric machine, which comprises:

a shator;

a rotatable shaft within the shator;

an armature attached to the shaft;

a commutator mounted on the shaft and connected to the armature;

a wearable brush mounted adjacent to the commutator, the brush comprising a plurality of cores arranged parallel to each other therein in a first direction, the cores comprising a core material;

means for urging the brush into contact with the commutator; and means for moving the brush in a second direction into contact with the commutator as the brush wears, the first direction in which the cores are arranged forming an acute angle with the second direction, the core material deposited on the commutator in different locations as the brush wears.

8. A dynamoelectric machine as defined in claim 7, wherein the acute angle is between 15° and 45°.

9. A dynamoelectric machine as defined in claim 8, wherein the acute angle is approximately 30°.

10. In an improved dynamoelectric machine having a rotatable commutator and a non-rotating brush, the wearable brush comprising a plurality of cores arranged parallel to each other therein in a first direction, the cores comprising a core material, the brush urged into contact with the commutator, and the brush movable in a second direction into contact with the commutator as the brush wears, the improvement comprising the brush having a plurality of cores arranged substantially parallel to each other in the first direction forming an acute angle with the second direction in which the brush moves as it wears, the position of the cores changing with respect to the commutator as the brush moves in the second direction to deposit core material on the commutator in different locations as the brush wears.

11. A dynamoelectric machine as defined in claim 10, wherein the acute angle is between 15° and 45°.

12. A dynamoelectric machine as defined in claim 11, wherein the acute angle is approximately 30°.

* * * * *

UNITED STATES PATENT AND TRADEMARK OFFICE

CERTIFICATE OF CORRECTION

PATENT NO. : 5,414,319
DATED : May 9, 1995
INVENTOR(S) : Henry B. Nowicki et al.

It is certified that error appears in the above-indentified patent and that said Letters Patent is hereby corrected as shown below:

Col. 1, line 21 "abrasivehess" should be --abrasiveness--
Col. 1, line 65 "burshes" should be --brushes--
Col. 2, line 15 "DESCRIPTIQN" should be --DESCRIPTION--
Col. 5, line 32 "shator" should be --stator--
Col. 5, line 33 "shator" should be --stator--

Signed and Sealed this

Twenty-fifth Day of July, 1995

Attest:

BRUCE LEHMAN

*Attesting Officer* *Commissioner of Patents and Trademarks*